United States Patent [19]

Trachman et al.

[11] Patent Number: 4,619,151

[45] Date of Patent: Oct. 28, 1986

[54] TWO SPEED AXLE SHIFT ACTUATOR

[75] Inventors: Edward G. Trachman, Birmingham; Daniel W. Roper, Rochester, both of Mich.

[73] Assignee: Rockwell International Corporation, Pittsburgh, Pa.

[21] Appl. No.: 725,270

[22] Filed: Apr. 19, 1985

[51] Int. Cl.[4] .................. G05G 3/00; G05G 17/00; F03G 1/10

[52] U.S. Cl. .......................................... 74/335; 74/2; 74/89.14; 74/89.17; 74/473 R; 185/40 R; 192/89 QT; 192/143

[58] Field of Search ................. 74/89.14, 89.17, 2, 74/335, 473 R; 192/89 QT, 109 A, 143; 185/40 R; 251/70, 71

[56] References Cited

U.S. PATENT DOCUMENTS

| | | | |
|---|---|---|---|
| 1,129,762 | 2/1915 | Townsend | 192/89 QT |
| 1,874,995 | 8/1932 | Heinauer | 192/89 QT |
| 2,634,622 | 4/1953 | Cripe | 74/335 |
| 2,655,042 | 10/1953 | Almond | 74/335 |
| 2,695,531 | 11/1954 | Thomas et al. | 74/335 X |
| 2,806,689 | 9/1957 | Miller | 192/143 X |
| 2,909,940 | 10/1959 | Dawkins | 74/527 |
| 2,984,065 | 5/1961 | Stuhler | 185/40 R X |
| 3,062,071 | 11/1962 | Morrow | 74/470 |
| 3,652,815 | 3/1972 | Davies | 200/153 SC |
| 3,773,995 | 11/1973 | Davies | 200/153 SC |
| 3,808,895 | 5/1974 | Fitzwater | 74/2 |
| 3,894,442 | 7/1975 | Hembree | 74/335 |
| 3,908,473 | 9/1975 | Bussen et al. | 74/100 R |
| 3,998,110 | 12/1976 | O'Brien et al. | 74/476 |
| 4,022,077 | 5/1977 | Brewer et al. | 74/473 R |
| 4,203,573 | 5/1980 | Boss | 251/133 |
| 4,428,248 | 1/1984 | Brouckson et al. | 74/335 |
| 4,444,072 | 4/1984 | Grimes et al. | 74/473 R |
| 4,454,776 | 6/1984 | Barge | 74/2 |
| 4,479,357 | 10/1984 | Stewart | 60/719 |

Primary Examiner—Allan D. Herrmann

[57] ABSTRACT

A low power electric motor slowly load to spring, which rapidly operates a two speed axle shift. An electric motor drives a nonreversing worm gear which engages a gear rack on a shaft. The shaft supports a caged spring. The motor moves the shaft, compressing the spring against one end of the cage, storing energy required for shifting. A solenoid piston holds the cage in position. When the shift is desired, the soleniod is tripped, the piston is raised and the spring moves the cage. An arm on the cage moves the shift lever. The solenoid piston engages the opposite detent in the cage and holds the cage in the new position. As the cage arrives at the new position, a lug trips a microswitch which completes a circuit to operate the motor in the reverse direction. The motor worm slowly drives the gear which slowly drives the rack to move the shaft in the reverse direction, compressing the spring against the opposite end of the cage. When the shaft moves sufficiently to fully load the spring, a lug on the shaft trips the switch turning the motor off. The next pulsing of the solenoid causes the spring to drive the cage in the opposite direction, back towards its first position, where the solenoid locks the cage. A lug in the cage trips the switch, turning the motor on to run in a forward direction, driving the shaft to its original position and compressing the spring until a lug on the shaft engages a switch, turning the motor off.

9 Claims, 2 Drawing Figures

TWO SPEED AXLE SHIFT ACTUATOR

This invention relates to linear actuating mechanisms with engergy storage and particularly to two speed axle shift units.

A problem exists in that it is desired to shift gears in two speed axles between low and high ranges as quickly as possible. Quick shifting of gears requires the use of appreciable force an energy. Electric, hydraulic and pneumatic systems for shifting axles between high and low speed ranges with sufficient force and energy to provide the requisite quickness are heavy.

The present invention seeks to overcome that problem by providing a light weight device which solves the problem.

U.S. Pat. No. 2,909,940 discloses a spring solenoid detent mechanism.

U.S. Pat. No. 3,062,071 discloses a trigger mechanism having a piston cock a spring.

U.S. Pat. No. 3,652,815 discloses a motor loading a spring release.

U.S. Pat. No. 3,773,995 discloses a motor loading spring release.

U.S. Pat. No. 3,808,895 discloses a cocked spring actuator.

U.S. Pat. No. 3,894,442 discloses the use of solenoids in shifters.

U.S. Pat. No. 3,908,473 discloses a linear motion snap action device.

U.S. Pat. No. 3,998,110 discloses a spring biased inhibitor for use in shifting.

U.S. Pat. No. 4,022,077 discloses control means with a spring lever capable of storing energy for shifting.

U.S. Pat. No. 4,203,573 discloses a reversible motor having a spring assist.

U.S. Pat. No. 4,428,248 discloses a rotational motor, and compression springs which urge the shift member axially.

U.S. Pat. No. 4,444,072 discloses a selective movement of a pin member controlled by a solenoid.

U.S. Pat. No. 4,454,776 discloses an electrical actuator having a spring.

U.S. Pat. No. 4,479,357 discloses a linkage system having a spring.

SUMMARY OF THE INVENTION

The present invention solves the problem of two-speed axle shifting by using a small, light, high-speed motor and a reduction worm gear, which drives a smaller gear which in turn drives a rack to compress a spring in one of two directions. Release of the spring quickly drives the shift to the desired position.

A low power electric motor slowly load to spring, which rapidly operates a two speed axle shift. An electric motor drives a nonreversing worm gear which engages a rear rack on a shaft. The shaft supports a caged spring. The motor moves the shaft, compressing the spring against one end of the cage, storing energy required for shifting. A solenoid piston holds the cage in position. When the shift is desired, the solenoid is tripped, the piston is raised and the spring moves the cage. An arm on the cage moves the shift lever. The solenoid piston engages the opposite detent in the cage and holds the cage in the new position. As the cage arrives at the new position, a lug trips a microswitch which completes a circuit to operate the motor in the reverse direction. The motor worm slowly drives the gear which slowly drives the rack to move the shaft in the reverse direction, compressing the spring against the opposite end of the cage. When the shaft moves sufficiently to fully load the spring, a lug on the shaft trips the switch turning the motor off. The next pulsing of the solenoid causes the spring to drive the cage in the opposite direction, back towards its first position, where the solenoid locks the cage. A lug in the cage trips the switch, turning the motor on to run in a forward direction, driving the shaft to its original position and compressing the spring until a lug on the shaft engages a switch, turning the motor off.

The above and further and other objects and features of the invention are apparent in the specification which includes the above and ongoing description and the claims in the drawings.

DETAILED DESCRIPTION OF THE DRAWINGS

Figure 1:
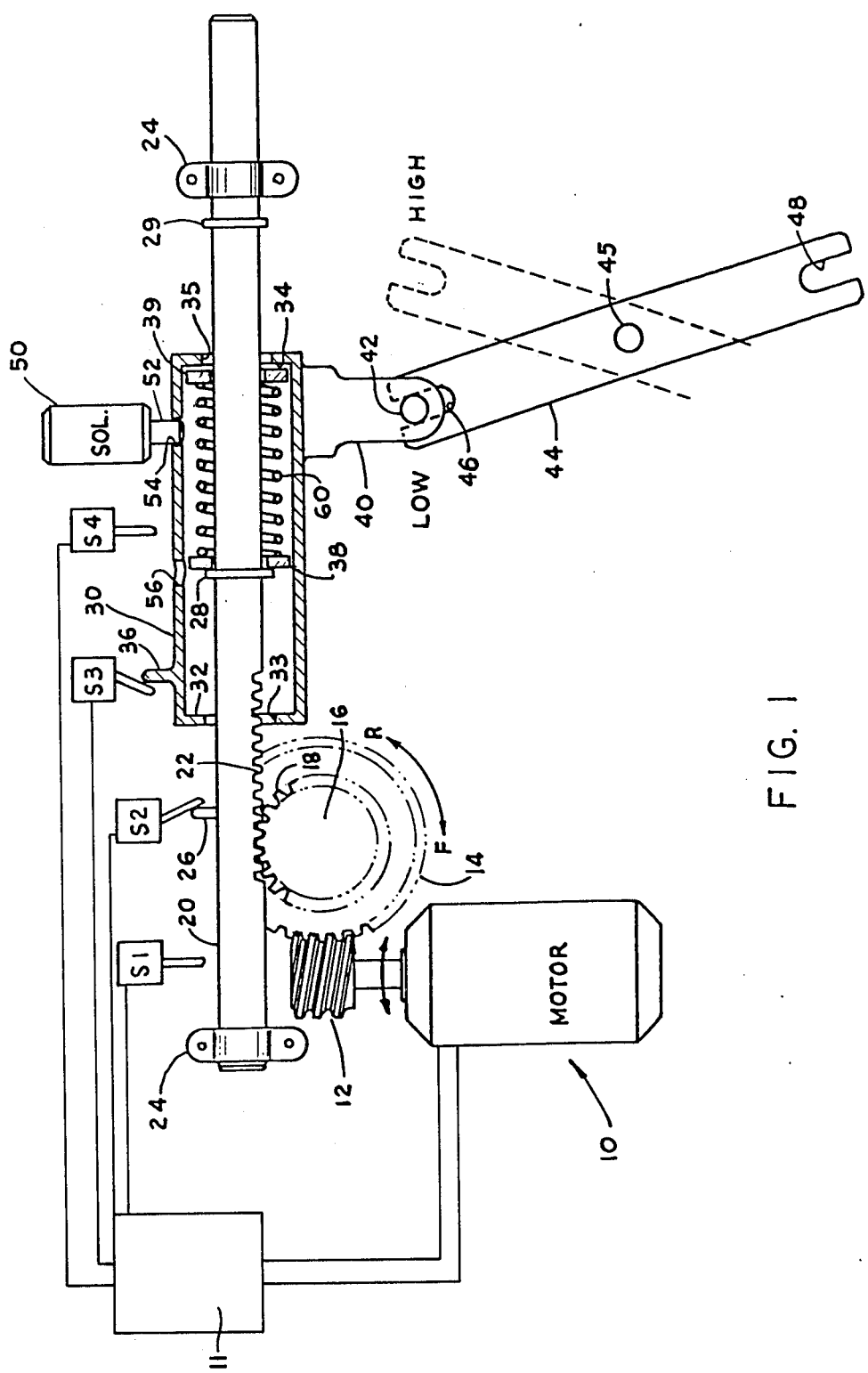
FIG. 1 shows the system in its usual position at the low speed selection with the spring compressed ready to drive the shifter to the high speed position.

Referring to FIG. 1, a small, light-weight, low power reversible motor 10 drives a worm 12 in either sense of rotation. The worm drives large gear 14 in a gear set 16 to which is attached a pinion 18. The relationship of gear 14 and pinion 18 is shown for convenience. In actual practice, gear 14 is substantially shown and pinion 18 may be substantially smaller than shown to further increase the torque multiplication substantially provided by the worm 12 and gear 14. Sliding bar 20 which has rack teeth 22 slides in bearings schematically as shown at 24. Pinion 18 drives rack 22 as gear 14 is turned out of the forward or reverse direction as shown by the arrow. Worm 12 and gear 14 are non-reversing. When motor 10 is stopped, worm 12 locks gear 14, pinion 18, rack 22 and sliding shaft 20 in fixed position.

Sliding shaft 20 has a lug 26 which moves with the shaft to operate either of microswitches S1 or S2. Rings 28 and 29 are permanently attached to the shaft 20 at predetermined locations.

Cage 30 surrounds a central portion of the shaft. Ends 32 and 34 of cage 30 have large openings 33 and 35 which permit passage of shaft 20 and rings 28 and 29. A lug 36 on cage 30 operates the microswitches S3 and S4. Washers 38 and 39 move within cage 30 and present an abutment for spring 60 and ends 32 and 34. The washers 38 and 39 may be permanently attached to the ends 60 if desired.

Arm 40 is permanently attached to cage 30 such as by welding. Arm 40 has a permanently attached pin 42 to operate shift lever 44 which pivots on pivot pin 45. Fork 46 of lever 44 receives pin 42 and fork 48 of lever 48 receives a shifting pin on a conventional two-speed axle shift unit which is not shown. Alternatively, arm 40 or a fixed projection on cage 30 may be connected directly to the speed changing gears in the conventional two-speed axle.

Solenoid 50 operates to quickly release cage 30 so that spring 60 may shift the two-speed axle unit. Solenoid 50 has a piston 52 which is pulsed upwardly against return spring force. Piston 52 fits within opening 54 or opening 56 of cage 30. As the piston 52 is pulled upward by solenoid 50, disengaging one hole, the piston moves along the surface of the cage 30 until it is aligned with the other hole, whereupon it is pushed into the hole, retaining the cage in the new position.

As shown in FIG. 1, motor 10 has already been cycled in the forward direction F to turn gear 14 and pinion 18 and to move rack 22 to the right to compress spring 60 against end 34 of the cage 30. The motor has been shut off by lug 26 engaging microswitch S2. A circuit 11 was completed to permit motor 10 to run in the forward direction by virtue of the contact of lug 36 with switch 3.

When it is desired to shift from the low speed to the high speed, solenoid 50 is pulsed, pulling piston 52 out of hole 54. Spring 60 drives cage 30 to the right to shift arm 44 to the high speed position as shown in dash lines in FIG. 1.

Figure 2:
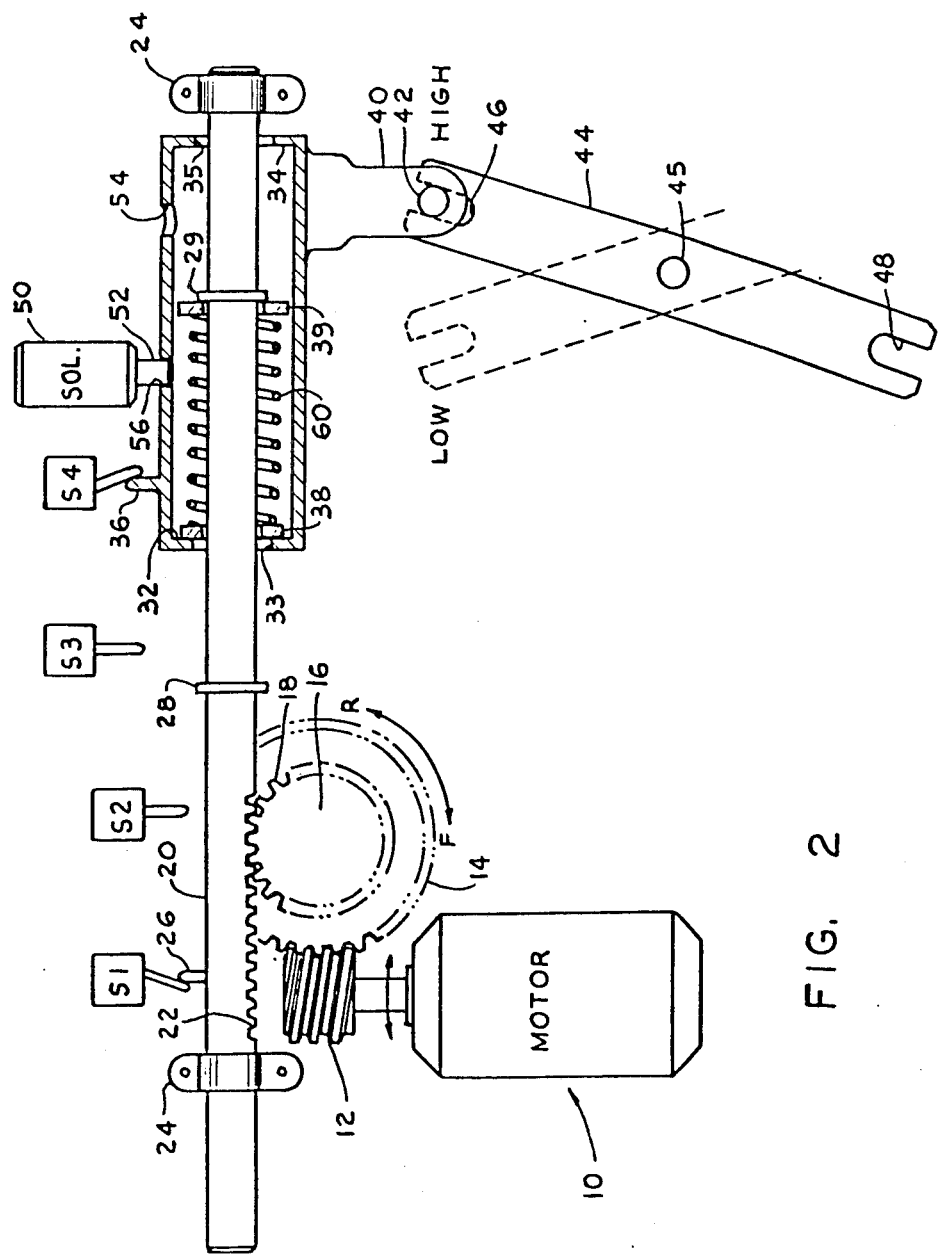
FIG. 2 shows the system at rest in the high speed condition with the spring compressed ready to shift the system to the low speed condition.

The condition in which cage 30 is moved to the right is shown in FIG. 2. In that position, piston 52 is pushed into hole 56 holding the cage 30 at the right. Lug 36 has contacted switch S4 causing motor 10 to run in the reverse direction to drive gear 14 and pinion 18 in the reverse direction R. Shaft 20 is moved to the left and ring 29 compresses spring 60 against end 32 of the cage. As shown in FIG. 2, as lug 26 engages switch 1, motor 10 is stopped. The system remains in the high speed condition with spring 60 compressed until solenoid 50 is pulsed to pull piston 52 from hole 56. In that condition, spring 60 will drive the cage to the left into the low position as limited by the switching lever 44 and by engagement of piston 52 in hole 54 of the cage.

As can be seen from the drawings, as soon as the cage is shifted to the new position, the motor begins to run in the opposite direction, compressing spring 60 to provide the next shift. The at rest state of the system in either low or high gear is with the spring compressed at one end of the cage by the shaft which is held in position by the non-reversing worm gear.

While the invention has been described with reference to specific embodiments, modifications and variations of the invention may be constructed without department from the scope of the invention, which is defined in the following claims.

That which is claimed is:

1. Reversible shifting apparatus for a two-speed axle comprising an axle unit shifting arm, a slidable spring cage connected to the shifting arm, a slidable shaft extending through the slidable spring cage, a spring surrounding said shaft in position within the cage, means fixed on the shaft at spacial part locations for compressing the spring against abutment means at opposite ends of the cage and the shaft is slid through the cage, reversible drive means connected to the shaft for driving the shaft through the cage, first locking means for locking the cage in predetermined position and second locking means for locking the shaft in predetermined position.

2. The apparatus of claim 1 wherein the first locking means comprises a solenoid having a piston selectively engageable with openings in the cage.

3. The apparatus of claim 1 wherein the driving means comprises a rack connected to the sliding shaft, a pinion connected to the rack, a gear connected to the pinion, a worm connected to the gear and a motor connected to the worm for driving the worm and the gear and the pinion, the rack and the shaft.

4. The apparatus of claim 1 wherein the second locking means comprises an irreversible connection between the worm and the gear.

5. The apparatus of claim 3 further comprising, switch operator means connected to the cage and switch means mounted adjacent the cage for contact by the switch operator means for completing a circuit to drive the motor when the cage is in predetermined position.

6. The apparatus of claim 5 wherein the switch means comprises first and second switch means for respectively completing circuits to permit the motor to run in forward and reverse directions upon the switch operator means contacting the first and second switch means.

7. The apparatus of claim 6 further comprising a second switch operator connected to the shaft and switch means mounted adjacent the shaft for contacting by said second switch operator when the shaft is in predetermined position for interrupting a drive circuit to the motor.

8. The apparatus of claim 7 wherein the switch means adjacent the shaft comprise first and second off switches for interrupting a power circuit to the motor when the shaft and second switch operator are in predetermined first and second positions.

9. The apparatus of claim 1 further comprising switch means mounted adjacent the cage and an operator connected to the cage for contacting the switch means for starting the drive means and switch means mounted adjacent the shaft and a shaft mounted operator for contacting the switch means adjacent the shaft for stopping the drive means.

* * * * *